(12) United States Patent
Rosen et al.

(10) Patent No.: US 11,272,087 B2
(45) Date of Patent: Mar. 8, 2022

(54) FLASH MODULE WITH SUBSTRATE PORTIONS HAVING DIFFERING WIDTHS

(71) Applicant: Google LLC, Mountain View, CA (US)

(72) Inventors: David Ian Rosen, Menlo Park, CA (US); Ying Zhou, Cupertino, CA (US); Andrew McKinley Schroeder, Chicago, IL (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/161,276

(22) Filed: Jan. 28, 2021

(65) Prior Publication Data

US 2021/0152716 A1    May 20, 2021

Related U.S. Application Data

(63) Continuation of application No. 16/437,801, filed on Jun. 11, 2019, now Pat. No. 10,924,647.

(51) Int. Cl.
| | |
|---|---|
| *H04N 5/222* | (2006.01) |
| *H04N 5/225* | (2006.01) |
| *F21V 13/04* | (2006.01) |
| *G02B 19/00* | (2006.01) |
| *G03B 15/05* | (2021.01) |
| *G02B 3/08* | (2006.01) |
| *F21Y 115/10* | (2016.01) |

(52) U.S. Cl.
CPC .......... *H04N 5/2256* (2013.01); *F21V 13/04* (2013.01); *G02B 3/08* (2013.01); *G02B 19/0028* (2013.01); *G02B 19/0061* (2013.01); *G03B 15/05* (2013.01); *F21Y 2115/10* (2016.08); *G03B 2215/0503* (2013.01); *G03B 2215/0567* (2013.01)

(58) Field of Classification Search
CPC ........ H04N 5/2256; F21V 13/04; G02B 3/08; G02B 19/0028; G02B 19/0061; G03B 15/05; G03B 2215/0503; G03B 2215/0567; F21Y 2115/10
USPC ........................................................ 348/370
See application file for complete search history.

(56) References Cited

U.S. PATENT DOCUMENTS

| | | |
|---|---|---|
| 7,379,117 B2 | 5/2008 | Hwang |
| 8,687,954 B2 | 4/2014 | You et al. |
| 9,575,392 B2 | 2/2017 | Hooton et al. |

(Continued)

FOREIGN PATENT DOCUMENTS

WO    WO2015193807    12/2015

*Primary Examiner* — Usman A Khan
(74) *Attorney, Agent, or Firm* — Fish & Richardson P.C.

(57) ABSTRACT

Methods, systems, and apparatus are provided for manufacturing a flash module. In some implementations, the method includes mounting at least one LED module on a top portion of a first substrate for providing light. A lens portion is mounted on a second substrate in a first region of the second substrate. The lens portion illuminates the light from the at least one LED module and the second substrate comprises the first region having a first diameter and a second region for providing a path for the illuminating light having a second diameter. The first diameter is greater than the second diameter. The second substrate is mounted on the first substrate. A substance is applied to a top portion of the second substrate from an end of the first diameter to the end of the second diameter and to a side portion of the second substrate in the second region.

17 Claims, 6 Drawing Sheets

(56) References Cited

U.S. PATENT DOCUMENTS

| | | |
|---|---|---|
| 10,359,689 B2 | 7/2019 | Chern et al. |
| 2010/0178046 A1 | 7/2010 | Moon et al. |
| 2012/0113361 A1* | 5/2012 | Huang .................. G06F 3/0412 |
| | | 349/96 |
| 2012/0212637 A1* | 8/2012 | Tsuduki ............ H01L 27/14683 |
| | | 348/222.1 |
| 2016/0349598 A1* | 12/2016 | Chern ..................... G03B 15/05 |
| 2017/0126944 A1* | 5/2017 | Jagt ......................... F21V 5/002 |
| 2018/0306405 A1* | 10/2018 | Kong ....................... G02B 3/08 |
| 2019/0052782 A1* | 2/2019 | Sung ...................... B23K 26/22 |
| 2019/0302573 A1 | 10/2019 | Choi |

* cited by examiner

*600*

```
┌─────────────────────────────────────────────────────────────────┐
│                                                                 │
│  Mount at least one LED module on a top portion of a first      │
│  substrate for providing light                                  │
│                                                                 │
│                                                             602 │
└─────────────────────────────────────────────────────────────────┘
                                  │
                                  ▼
┌─────────────────────────────────────────────────────────────────┐
│ Mount a lens portion on a second substrate in a first region of │
│ the second substrate, wherein the lens portion illuminates the  │
│ light from the at least one LED module and the second substrate │
│ comprises the first region having a first diameter and a second │
│ region for providing a path for the illuminating light having a │
│ second diameter, wherein the first diameter is greater than the │
│ second diameter                                             604 │
└─────────────────────────────────────────────────────────────────┘
                                  │
                                  ▼
┌─────────────────────────────────────────────────────────────────┐
│                                                                 │
│         Mount the second substrate on the first substrate       │
│                                                                 │
│                                                             606 │
└─────────────────────────────────────────────────────────────────┘
                                  │
                                  ▼
┌─────────────────────────────────────────────────────────────────┐
│ Apply a substance to a top portion of the second substrate from │
│ an end of the first diameter to the end of the second diameter  │
│ and to a side portion of the second substrate in the second     │
│ region.                                                     608 │
└─────────────────────────────────────────────────────────────────┘
```

FIG. 6

FLASH MODULE WITH SUBSTRATE PORTIONS HAVING DIFFERING WIDTHS

CROSS-REFERENCE TO RELATED APPLICATIONS

This application is a continuation of and claims priority to U.S. application Ser. No. 16/437,801, filed on Jun. 11, 2019, the entire contents of which are hereby incorporated by reference.

FIELD

This specification relates generally to illumination systems for client devices.

BACKGROUND

Photographing an object often requires illuminating the object using a light source. To illuminate the object, the light source can adjust its light intensity based on its distance to the object and an ambient light level sensed in the environment surrounding the object.

SUMMARY

In general, the specification describes a flash module that emits light to illuminate a scene or an environment prior to a device capturing an image. The flash module includes at least one light emitting diode (LED) and a lens element contained within a single unit. The LED provides a light at a particular light intensity. The lens element can include one or more elements that illuminate the light by the LED by dispersing or focusing the light through means of refraction. The single unit architecture of the flash module enables the flash module to be integrated in various devices, such as a mobile device, a camera, and other hand-held devices.

Many advantages exist relating to the design and performance of the flash module. In particular, the design of the flash module lends itself to lower manufacturing complexity, lower part-count, improved cosmetics, and as a result, lowers cost. In some implementations, the flash module can be designed to have a "top hat" shape. In the "top hat" shape design, a top surface of the "top hat" is user facing. The user-facing portion of the flash module is exposed to the outside world without a protective cover. The user-facing portion of the flash module does not require the protective cover because a material of the flash module is resistant to deformations and can withstand high heat. In particular, the material of the flash module is designed with high temperature resistance enabling it to withstand full surface-mount technology (SMT) temperatures, such as those caused by reflow soldering, and resist physical deformation from the high temperatures. Additionally, the material of the flash module includes a high pencil hardness and can withstand temperature imparted by reflow soldering during the integration of the flash module to a client device. As a result, the high hardness, temperature, and deformation resistance, in conjunction with the unique "top hat" shape, eliminates the need for a protective covering on the user-facing portion of the flash module.

In another advantage, the flash module is resistant to water and solid intrusion according to the ingress protection rating. For example, the material of the flash module can attach to a water adhesive that allows the flash module to pass water ingress standards having a rating of IP68. The water adhesive can be attached to a portion of the flash module such that it is not visible to the consumer's eye when integrated into the client device but still effective in waterproofing the flash module. Thus, the flash module can withstand water damage after submerging in water for a predetermined time.

In one general aspect, a method of manufacturing is performed. The method includes: mounting at least one LED module on a top portion of a first substrate for providing light; mounting a lens portion on a second substrate in a first region of the second substrate, wherein the lens portion illuminates the light from the at least one LED module and the second substrate comprises the first region having a first diameter and a second region for providing a path for the illuminating light having a second diameter, wherein the first diameter is greater than the second diameter; mounting the second substrate on the first substrate; and applying a substance to a top portion of the second substrate from an end of the first diameter to the end of the second diameter and to a side portion of the second substrate in the second region.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The foregoing and other embodiments can each optionally include one or more of the following features, alone or in combination. For example, one embodiment includes all the following features in combination.

In some implementations, a shape of a side-view of the flash module is a top hat shape.

In some implementations, the lens portion of the second substrate is unattached to the first substrate.

In some implementations, a lens of the lens portion further comprises at least one of a fresnel lens, a concave lens, and a convex lens.

In some implementations, a width of the lens comprises at least one of a width of the second diameter, a width extending outside the second diameter, and a width extending to an end of the first diameter on the second diameter.

In some implementations, the method includes applying a water adhesive to a top portion of the second substrate from an end of the first diameter to the end of the second diameter without contacting the side portion of the second substrate in the second region.

In some implementations, the second region of the second substrate comprises at least one of a cube portion, a cuboid portion, a dome portion, and a cylindrical portion.

In some implementations, a top portion of the second region of the second substrate comprises a transparent surface.

In some implementations, the method includes mounting a second lens portion on the top portion of the second region, wherein the second lens portion comprises at least one of a fresnel lens, a concave lens, and a convex lens.

In some implementations, a top portion of the second substrate comprises an absorptive surface or a reflective surface from the applied substance.

In some implementations, the flash module comprises a first LED module and a second LED module.

In some implementations, the first substrate includes at least one SMT pad, each SMT pad provides electrical power to power the at least one LED module.

In some implementations, a number of the at least one LED modules mounted on the first substrate is directly related to a number of the at least one SMT pad of the first substrate, and wherein each SMT pad connects to at least one of an anode and a cathode and connects to the at least one LED module for providing the electrical power to power the at least one LED module.

In some implementations, the method includes applying a frosted material to a top portion of the second region of the second substrate, wherein the frosted material reduces sharp effects caused by illumination from the lens portion in the second substrate.

In some implementations, a top portion of second substrate comprises a surface slanted at a particular angle between the top portion of the first region on the second substrate and the side portion of the second region on the second substrate.

In some implementations, the particular angle comprises at least 0 degrees, 45 degrees, and 90 degrees.

In some implementations, the side portion of the second region on the second substrate comprises an absorptive surface or a reflective surface.

In some implementations, the method further includes applying a liquid adhesive along the side portion of the second region on the second substrate.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 6 is a flow diagram that illustrates an example process for assembling a flash module.

Like reference numbers and designations in the various drawings indicate like elements.

DETAILED DESCRIPTION

A lens can include a clear, protective cover for the flash module that serves various purposes. First, the protective cover seeks to protect the flash module from scratches and abrasions that may ultimately damage the cosmetic and performance of the flash module. Second, the protective cover improves the aesthetic appearance of the client device. In particular, the protective cover acts as a spacer to create coplanar surfaces between the client device housing the flash module and the flash module itself. However, as will be further described below, the flash module described in this specification does not require a protective cover because it has a unique shape, appearance, functionality, and material that allow it to be exposed to the outside world, i.e., user facing. As such, this flash module can repel abrasions and withstand deformations from high temperature independently of a protective cover.

Figure 1:
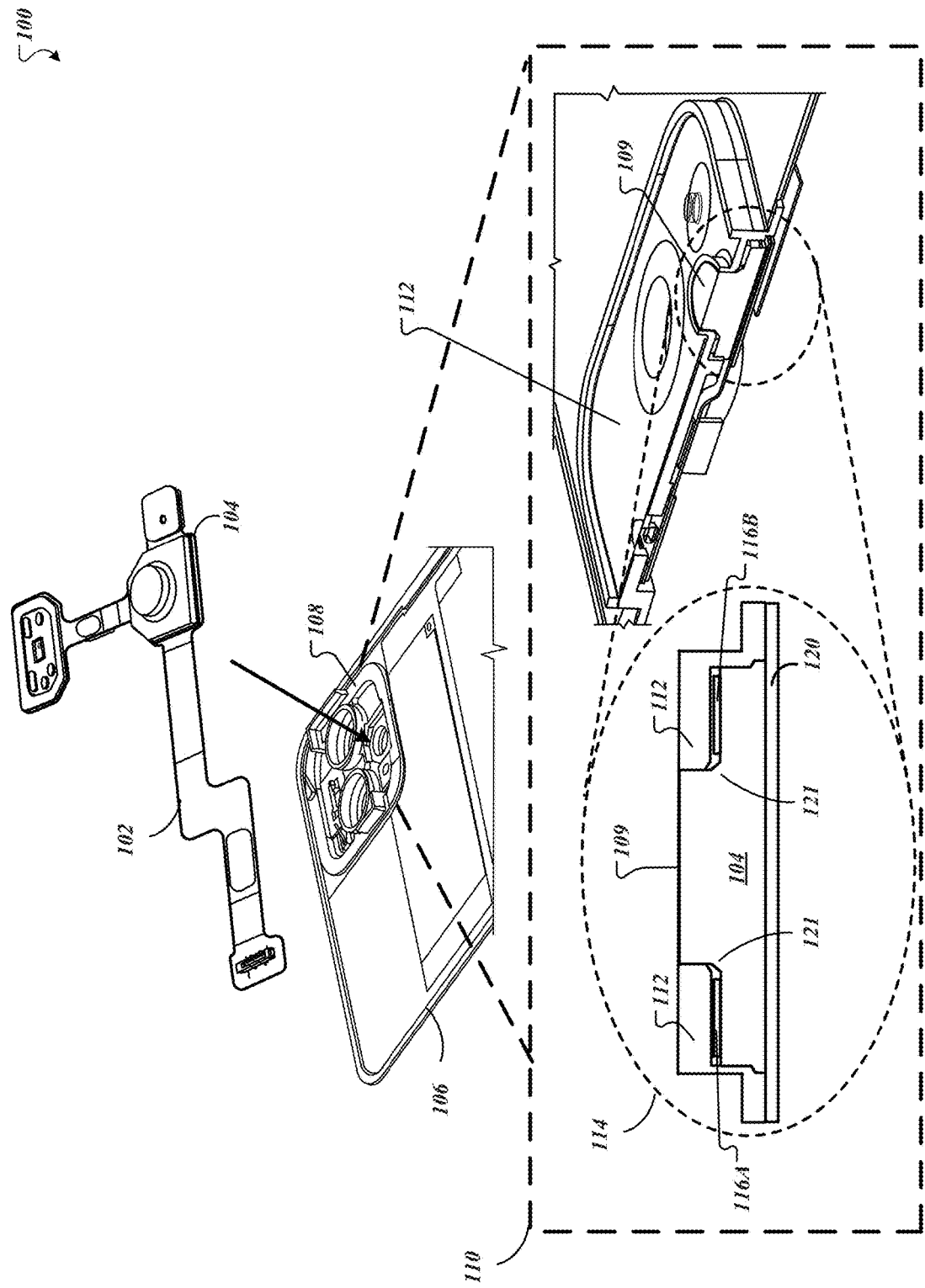
FIG. 1 is a block diagram that illustrates an example of a system for incorporating a flash module in a client device.

FIG. 1 is a block diagram that illustrates an example of a system 100 for incorporating a flash module 104 in a client device 106. In particular, the flash module 104 is first attached to a flex circuit 102. A flex circuit, such is flex circuit 102, is used to connect electronic components within the client device 106 and provide a means for the electronic components to communicate with one another. For example, a processor or motherboard of the client device 106 can communicate with the flash module 104 through the flex circuit 102 to adjust its light intensity or to flash its light upon command.

The flex circuit 102 and the flash module 104 can be integrated together using various methodologies. For example, the flex circuit 102 and the flash module 104 can be integrated using a surface mount technology (SMT) soldering and reflow process. In other implementations, the flex circuit 102 and the flash module 104 can be integrated together using anisotropic conductive film (ACF) without the use of heat.

In some implementations, the flex circuit 102 and the flash module 104 can be integrated together into the client device 106. In other implementations, the flash module 104 can be integrated independently, without the use of the flex circuit 102, into the client device 106. In the case that the flash module 104 is independently integrated, the client device 106 can include a connector that connects to the flash module 104 and enables the flash module 104 to fit into the client device 106 without the flex circuit 102.

The flex circuit 102 and the flash module 104 can be integrated on a front surface of the client device 106. Alternatively, the flex circuit 102 and the flash module 104 can be integrated on a rear surface or another surface of the client device 106. As illustrated in system 100, the flex circuit 102 and the flash module 104 are integrated on the rear surface of the client device 106 within proximity to the camera.

The flex circuit 102 and the flash module 104 can be integrated within or near a camera portion of the client device 106. In some implementations, as shown in system 100, the flex circuit 102 and the flash module 104 can be integrated within the camera portion 108 of the client device 106. By integrating the flash module 104 in proximity to one or more camera lenses within the camera portion 108, the light source from flash module 104 will produce light in a direct line of sight for the camera lenses during photographing of an object.

The client device 106 can include, for example, a mobile phone, a personal computer, a handheld device, a portable digital assistant (PDA), a music player that captures photographs, and other computer related devices. Additionally, the client device 106 can include other non-computer related devices that capture photographs. In the example shown in system 100, the client device 106 includes a mobile phone receiving the flex circuit 102 and the flash module 104 in the camera portion 108.

The system 100 illustrates a view 110 that shows the flash module 104 in various implementations. In particular, in one implementation, the view 110 illustrates an orthographic view of a cross-section of the client device 106 with the integrated flash module. Once the flex circuit 102 and the flash module 104 are integrated into the client device 106, a top portion 112 is mounted over the camera portion 108. The top portion 112 contains and protects the components in the camera portion 108, including the flash module 104. However, the top surface 109 of the flash module 104 is exposed to the outside world, i.e., user facing, and is not covered by the top portion 112.

The view 110 also illustrates a side view 114 of a cross section of the flash module 104 integrated into the client device 106. In particular, the side view 114 illustrates the flash module 104 integrated within the client device 106 and covered by the top portion 112. Additionally, the side view 114 illustrates the top surface 109 exposed to the outside world and not covered by the top portion 112. The flash module 104 contains one or more LEDs and a lens element, which will be further described below.

As shown in the side view 114, the flash module has an overall "top hat" shape that includes a top cylindrical portion and a bottom portion, where the bottom portion is wider than the top cylindrical portion. In particular, the bottom portion has a first diameter and first sidewalls. The cylindrical portion has a second diameter and second sidewalls. The first diameter is greater than the second diameter. For example, the first diameter of the bottom portion is 7.5 millimeters and the second diameter of the cylindrical portion is 3.8 millimeters. Other diameter dimensions are also possible for each of the top cylindrical portion and the bottom portion. In the same example, the height of the first sidewalls is 0.8 millimeters and the height of the second sidewalls is 1.22 millimeters.

In some implementations, the flash module 104 can be another shape, besides a "top hat" shape. For example, the flash module 104 can be dome shaped, concave shaped, convex shaped, cube shaped, or pyramidal shaped. The shape can be based on manufactured-desired characteristics. For example, a dome shaped flash module 104 may be desired if the manufacture desires the flash module's light to be emitted in a wider dome-like shape.

In some implementations, the flash module 104 includes collarbone regions 121. The collarbone regions 121 are included to improve the optical performance of the flash module 104. The collarbone regions 121 can include a height of 0.29 millimeters, for example. Additionally, the width of the collarbone regions can include a width of 0.34 millimeters, for example. As will be further described below, the collarbone regions 121 include regions that slant at a particular angle based on manufacturer's requirements.

The flash module 104 can adhere to adhesives to protect itself from water, solids, or other external objects. For example, adhesives 116A and 116B are mounted on a shoulder region of the flash module 104. The adhesives 116A and 116B are mounted around the top cylindrical portion in a circular fashion without coming into contact with the top cylindrical portion and the collarbone regions 121. For example, the adhesive can be a water adhesive that adheres to the material of the flash module 104 or another type of adhesive. The adhesive protects the components within the flash module 104 from being damaged by water or other external objects. In particular, if the adhesive is a water adhesive, the flash module 104 can withstand water damage under the water ingress standards of IP68, which allows the flash module 104 to be submerged at 1.5 meters of water for 30 minutes without receiving deformation or cosmetic damage that would affect performance. Additionally, when the flash module 104 is integrated into the client device 106, the water adhesive is not visible to the consumer's eye but is still effective in waterproofing the flash module 104. In the case where the flash module 104 is submerged under water, water will reside in between the top cylindrical portion and a side of the adhesive without damaging any of the electrical components within the flash module 104.

In some implementations, the flash module 104 is attached to a printed circuit board (PCB) 120. The PCB 120 can be a substrate that includes one or more SMT pads. For example, the PCB 120 can include four SMT pads, one substrate for each electrical connection to the LEDs. Each SMT pad is electrically conductive and can provide power to each of the LEDs in the housing unit 116. In other implementations, the flash module 104 attaches directly to the flex circuit 102 without the use of the SMT pads.

In some implementations, a top surface of the PCB 120 (facing the mounted LEDs) can be painted with a substance of a particular color. The top surface of the PCB 120 is painted a particular color to give the flash module 104 a desired optical effect. For example, the top surface of the PCB 120 may be painted white, which is a reflective color and used to improve the reflection of the light during a flash. Alternatively, the top surface of the PCB 120 may be painted black, which is an absorptive color and used to absorb some of the light during a flash. In other examples, the top surface of the PCB 120 may be painted other manufacturer or customer desired colors, such as green or yellow.

The dimensions of the PCB 120 can be equal to a length of the first diameter of the housing unit 116 and a width of the flash module 104. In other implementations, the dimensions of the PCB 120 can extend past the first diameter of the flash module 104. In some examples, the height of the PCB 120 can be 0.5 to 1 millimeter.

In some implementations, the flash module 104 can be assembled using various processes. In particular, liquid molding a high temperature epoxy creates the lens element of the flash module 104. For example, a master steel tool creates a tooling copy of the lens or a negative of the lens. The tooling copy of the lens creates a silicone mold of the lens, i.e., the negative of the lens. Then, the silicone mold creates the actual lens part. In some cases, the silicone mold of the lens is useful for 40 or more flashes of the flash module.

Figure 2:
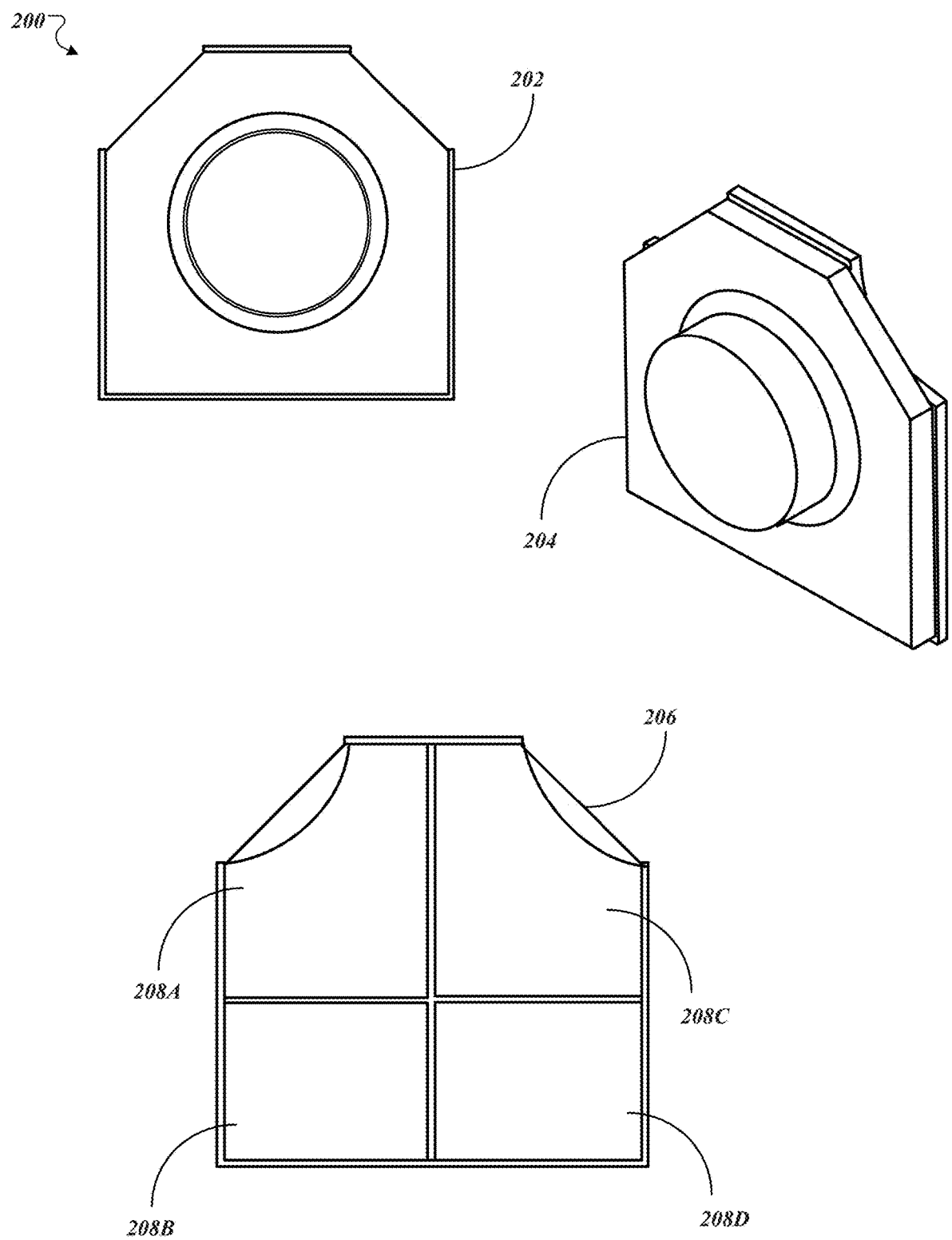
FIG. 2 is a block diagram that illustrates an example of a system showing various views of a flash module.

FIG. 2 is a block diagram that illustrates an example of a system 200 showing various views of a flash module. In particular, the system 200 shows a top view 202 of the flash module, an orthographic view 204 of the flash module, and a bottom view 206 of the flash module. The bottom view 206 of the flash module illustrates various SMT pads connected together to form the substrate that sits below the flash module, e.g., the substrate 120 shown in system 100.

The bottom view 206 shows the substrate attached to the flash module. In particular, the substrate includes four SMT pads, e.g., SMT pad 208A, SMT pad 208B, SMT pad 208C, and SMT pad 208D. Each SMT pad is electrically conductive and can provide power to the LED components within the flash module. Each LED component requires two electrical inputs—an anode connection and a cathode connection, to power the LED component. The flash module illustrated in system 200 includes two LED components, thus requiring four electrical inputs from the substrate. By providing four SMT pads for two LED components, each LED component can be driven independently, e.g., adjust each LED component's brightness independently and flash each LED component independently. For example, the SMT pads 208A and 208B are connect to an anode and cathode connections, respectively, to provide power to one LED component, and the SMT pads 208C and 208D connect to the same anode and cathode connections, respectively, to provide power to the other LED component. In other examples, if the flash module includes more than two or less than two LED components, the number of SMT pads can also change. For example, if the flash module includes one LED component, the flash module would attach to only two SMT pads. In another example, the flash module can include three LED components or four LED components that connect only to two SMT pads. In this example, the number of SMT pads can be reduced if the LED components are wired in series with one another.

Figure 3:
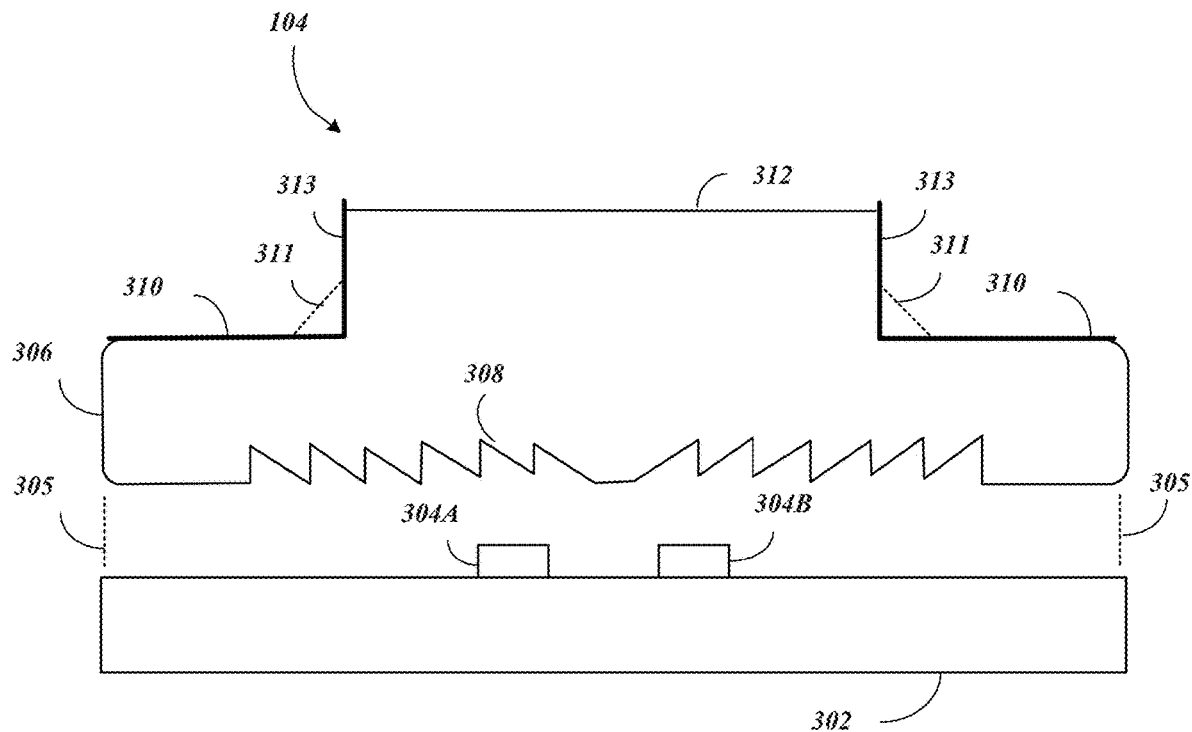
FIG. 3 is a block diagram that illustrates an example of a side view of a flash module.

FIG. 3 is a block diagram that illustrates an example of a side view of a flash module 104. In particular, the flash module 104 includes a substrate 302, LED components 304A and 304B, a connector 305, a lens 308, a housing unit 306, shoulder regions 310, collarbone regions 311, a top surface 312, and neck regions 313. The flash module 104 illustrated in FIG. 3 is similar to the flash module 104 illustrated in system 100 and the flash modules illustrated in system 200. In particular, the substrate 302 is similar to the substrate 120 from the system 100. Additionally, the flash module 104 can include additional components not shown in FIG. 3, such as, for example, the wires, e.g., anode and cathode wires, that provide power to the LED components 304A and 304B through the SMT pads along with the holes within the top surface 312 to aid in providing illuminating light from the LED components 304A and 304B. In particular, the top surface 312 may include two holes when the lens 308 is a fresnel lens for improving illumination.

The substrate 302 and the housing unit 306 are mounted together using connector 305. The connector 305 is a vertical connector that connects around an outer portion of the substrate 302 and the housing unit 306. In particular, the connector 305 connects to an outer portion of the top portion of substrate 302 and to an outer portion of the bottom portion of the housing unit 306. As a result, the connection between the substrate 302 and the housing unit 306 creates a gap region for the LED components to exist. For example, the LED components 304A and 304B, which are mounted to a top portion of the substrate 302, exist within the gap region between the housing unit 306 and the substrate 302. In particular, the LED components 304A and 304B are mounted to the substrate 302 using an SMT soldering and reflow process. The lens 308 is located directly above the LED components 304A and 304B to illuminate the light provided by the LED components. In particular, the lens 308 is unattached to the substrate 302. As shown in FIG. 3, the flash module 104 includes two LED components 304A and 304B. The flash module 104 can also include more than two LED components or less than two LED components.

In some implementations, the distance between the LED components can vary based on a number of LED components within the flash module 104. For example, the distance from a center of the LED component 304A to a center of the LED component 304B is 1.7 millimeters. Other distances are also possible.

The housing unit 306 includes a first region with a first diameter and a second region with a second diameter. As illustrated in FIG. 3, the first region houses the lens 308 and the second region is the top cylindrical portion, where the first diameter is greater than the second diameter. As discussed above, the first diameter can be 7.5 millimeters and the second diameter of the top cylindrical portion can be 3.8 millimeters, for example. In the same example, the sidewall height of the first region can be 1.22 millimeters and the sidewall height of the second region can be 0.8 millimeters.

In some implementations, the housing unit 306 can be made of a material that has various properties. The material can include a specific type of epoxy compound, such as epoxy resin, generally designed to have the following properties. For example, the material of the housing unit 306 is robust to scratches, abrasions, bruises, and cracks. On the pencil hardness scale, the material includes a pencil hardness of 2H, for example. Additionally, not only does the material of the housing unit 306 withstand deformation behavior from external forces, since a top surface 312 of the housing unit is "user-facing," but also the material is able to withstand high temperatures from soldering and other external heat. For example, the material can withstand the high temperatures from soldering without deforming during a reflow soldering process. In another property, the material of the housing unit 306 includes properties that allow for adhering to a water adhesive for waterproofing the flash module 104, such as the water adhesives 116A and 116B of system 100. In order for the material to adhere to a specific water adhesive, the material must include a specific surface energy. Lastly, the top surface of the material is clear or transparent and the material allows light to pass from the LED components through the top surface 312. Thus, by using a material that is robust to abrasions, does not deform to high temperatures, adheres to a water adhesive, and allows light to pass, the flash module 104 can perform in extreme conditions in the client device 106.

The housing unit 306 also includes a lens 308. The lens 308 is mounted on the bottom portion of the housing unit 306. In particular, the lens 308 can be glued to the bottom of the housing unit 306 using a particular substance. For example, the lens 308 can be flued using epoxy, ultra violet (UV) cure glue, or cyanoacrylate glue (CA glue). In another example, the lens 308 is assembled to the bottom of the housing unit 306 with a charge coupled device (CCD) technology using epoxy. Subsequently, the housing unit 306 and the now glued lens 308 are then mounted to a flexible printed circuit (FPC) board or a PCB board, such as the substrate 302. In particular, the housing unit 306 and the glued lens 308 can be soldered onto the substrate 302 over top the LED components 304A and 304B. The CCD technology can be used to orient and line up the glued lens 308 with the LED components 304A and 304B. As a result, the lens 308, the housing unit 306, and the substrate 302 can withstand the high temperatures from soldering without deforming during the reflow soldering process.

In some implementations, the lens 308 can include a fresnel lens. The fresnel lens can include a pattern of concentric circles. For example, the fresnel lens can include imaging fresnel lenses that have curved cross-sections and produce sharp light. In another example, the fresnel lens can include non-imaging fresnel lenses that have flat cross-sections and do not produce sharp light. The fresnel lens can include sharp concentric edges having a width that extends from a center of the first region to an end of the second diameter of the second region. In other implementations, the fresnel lens can have a width that extends from the center of the first region to the middle of the shoulder region 310 in the first region, as shown in FIG. 3. In other implementations, the fresnel lens can extend to a middle of the shoulder region 310 or to an end of the first diameter in the first region.

The properties of the fresnel pattern can be adjusted to generate a particular optical effect from the LED components. For example, a manufacturer can adjust the depth of the grooves of the fresnel lens 308, the spacing of the grooves, the pitch of the grooves, and the size of the fresnel pattern. Based on a particular configuration of the fresnel pattern, the flash module may emit light with a particular pattern. The manufacturer can fine-tune these parameters to generate a specific configuration of the fresnel pattern, which generates a specific light pattern from the flash module 104.

In some implementations, extending the fresnel pattern past the first diameter of the first region into the shoulder region 310 includes optical and cosmetic benefits. For example, the fresnel pattern may emit a desired light pattern from the LED components when the fresnel pattern extends into the shoulder region 310. That particular light pattern can change based upon the design and size of the fresnel pattern. The look of the fresnel pattern may meet a desired cosmetic appearance specified by a particular manufacturer or customer. As a result, the fresnel lens pattern may produce a particular light appearance that a consumer may desire when the pattern is integrated within the client device 106.

The second region of the housing unit 306 includes a particular shape. In some implementations, the second region of the housing unit 306 is a cylindrical shape, as shown in FIG. 2. The cylindrical shape may be chosen for cosmetic purposes. Additionally, a shape of the flash module 104 is designed based on how the flash module 104 fits within a client device 106. Thus, the second region of the housing unit 306 can include any particular shape, such as a dome, a flat shape, a cube shape, a cuboid shape, or a pyramid shape, to name a few examples. In other implementations, the fresnel lens 308 can be mounted on the top surface 312 of the housing unit 306. However, in this implementation, the fresnel lens 308 on top of the top surface 312 would require a protective covering because the fresnel lens includes sharp edges that may cut a user. Alternatively, other types of lenses that are not sharp, such as concave and convex lenses, can be placed on the top surface 312 that do not require a protective cover.

The design of the flash module also provides a testing advantage. In typical systems, lenses and other flash modules cannot be tested before sold to customers because a protective cover covers the other flash modules. Thus, the other flash modules may experience different effects in the final product because of how it reacts with the customer and the protective cover in real-world situations. However, flash module 104, which is exposed to the outside world in the final product, can be tested in a manner that is representative of the final product of the flash module. The flash module 104 can be scratched, dropped, bruised, and burned during development in a similar manner to how a customer might harm the flash module 104.

In some implementations, the flash module 104 includes a shoulder region 310 and a collarbone region 311. The shoulder region 310 provides an area for the application of the water adhesive. The water adhesive includes a thickness of at least 1.0 millimeters, for example. The water adhesive is firmly pressed against the shoulder region 310 without coming into contact with the collarbone region 311 and the neck region 313. The water adhesive does not come into contact with the collarbone region 311 and the neck region 313 of the housing unit 306 because when the flash module 104 is installed in a cylindrical housing, such as shown in system 100 the cylindrical portion is installed in a tight cylindrical housing. As such, the water adhesive would not fit between the neck region 313, the collarbone region 311, and the tight cylindrical housing in the camera portion 318. If the water adhesive is placed up to the collarbone region 311 or up to the neck region 313, then, when the flash module 104 is installed in the tight cylindrical housing, the water adhesive would be scrunched and squeezed out of the tight cylindrical housing in the camera portion 108. Thus, the water adhesive is only applied on the shoulder 310. In some implementations, a liquid adhesive may be inserted up to the collarbone region 311 or around the neck region 313 for lubrication purposes. The liquid adhesive is thinner than the water adhesive and will not be scrunched or squeezed out of the tight cylindrical housing in the camera portion 108 during the installation of the flash module 104.

The collarbone region 311 can include a slanted region between the neck region 313 and the shoulder region 310. The collarbone region 311 is included to generate a particular optical performance of the flash module 104. For example, the collarbone region 311 can be angled between the shoulder region 310 and the neck region 313 from 0 degrees to 90 degrees. As illustrated in FIG. 3, the dotted line of the collarbone region 311 is angled at 45 degrees. When the collarbone region 311 is angled at the extremes of 0 and 90 degrees, the flash module 304 can produce a non-uniform or dim flash. Alternatively, when the collarbone region 311 is angled at 45 degrees or within a threshold range of 45 degrees, the flash module 104 can produce a uniform or bright flash. Thus, the angle of the collarbone region 311 may be tuned or adjusted to generate a desired optical performance of the flash. Additionally, the angle of the collarbone region 311 is adjusted to affect the absorption and the reflection of the flash. In some cases, the collarbone region 311 may extend from a top of the neck region 313 to a middle portion of the shoulder region 310. In another case, the collarbone region 311 may extend from the top of the neck region 313 to an end of the shoulder region, e.g., to an end of the first diameter in the first region of the housing unit 306, to give the flash module 104 an overall pentagon shape.

In some implementations, the shoulder region 310, the collarbone region 311, and the neck region 313 can be painted with a color to generate a desired optical effect on the flash module 104. In particular, the shoulder region 310, the collarbone region 311, and the neck region 313 can be painted with a matte black color to enhance the optical performance of the flash module 104. The matte black color ensures these three regions offer an absorptive surface and that the lens 308 stands out from the surrounding matte black color. Additionally, these three regions can be painted with other colors to generate a desired optical effect of the flash module 104.

Typically, light emitted from the LED components 304A and 304B only emits from the top surface 312 of the flash module 104. However, some of the light leaks out at the neck region 313. Thus, by painting the neck region 313 and the collarbone region 311 a dark color, such as black, the leaked light can be absorbed by the dark color. In other implementations, these regions can be painted a particular color to meet specification requirements for the particular client device in which the flash module 104 is to be integrated.

In some implementations, the color of the material of the housing unit 306 can affect the brightness of the lens 308. In particular, the color of the material can be a shiny silver color or another bright color that can affect the aesthetics of the lens. Additionally, the color of the lens 308 can be a clear color. Thus, by painting the shoulder region 310, the collarbone region 311, and the neck region 313, a dark color, the overall brightness of the lens 308 is emphasized and stands out.

Figure 4:
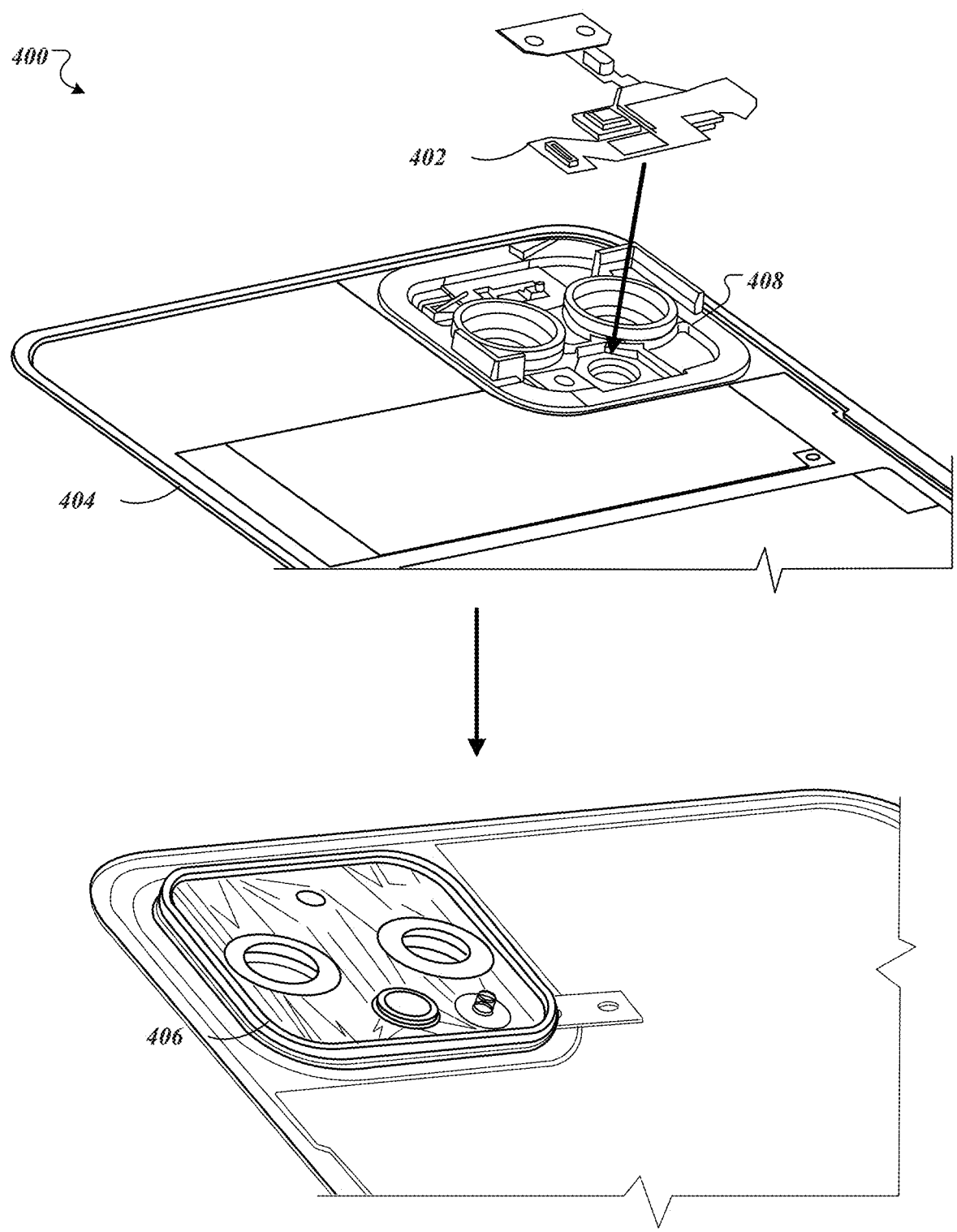
FIG. 4 is another block diagram that illustrates an example of a system for incorporating a flash module in a client device.

FIG. 4 is another block diagram that illustrates an example of a system 400 for incorporating a flash module in a client device 404. The system 400 is similar and includes similar components to those in system 100. For example, system 400 includes a flex circuit 402 attached to a flash module, a client device 404, a top portion 406, and a camera portion 408. The flex circuit 402 is similar to the flex circuit 102 from system 100, except the flex circuit 402 has been folded or bent in half.

In some implementations, the flex circuit 402 is folded to fit within the camera portion 408 before the flex circuit 402 is inserted into the client device 404. Folding the flex circuit 402 is necessary during the production of the client device 404. For example, during the production of the client device 404, the client device 404 is preassembled and the top portion 416 is attached as the last step. As a last step, the flex circuit 402 is attached to the top portion 416 of the client device 404. The flex circuit 402 must then connect to the motherboard, which is located in the main body of the client device 404. The flex circuit 402 includes a tail that acts as a service loop to connect to the motherboard. Thus, when the top portion 416 connects to the flex circuit 402, the service loop of the flex circuit 402 unfolds and connects to the motherboard. Then, the motherboard can communicate with the flash module connected to the flex circuit 402.

As illustrated in system 400, the flash module attached to the flex circuit 402 fits within a metal ring in the camera portion 408. The metal ring encompasses and encloses the top portion, e.g., the top cylindrical portion, of the flash module 104. Thus, the flash module 104 is designed to have a cylinder shape as its top portion to fit within the metal ring. If the client device 404 included a component different from a metal ring, such as a pentagon shaped hole, the top portion of the flash module 104 would be required to have a cosmetic shape that matches the pentagon shaped hole, such as a pentagon. Other shapes are also possible.

Figure 5:
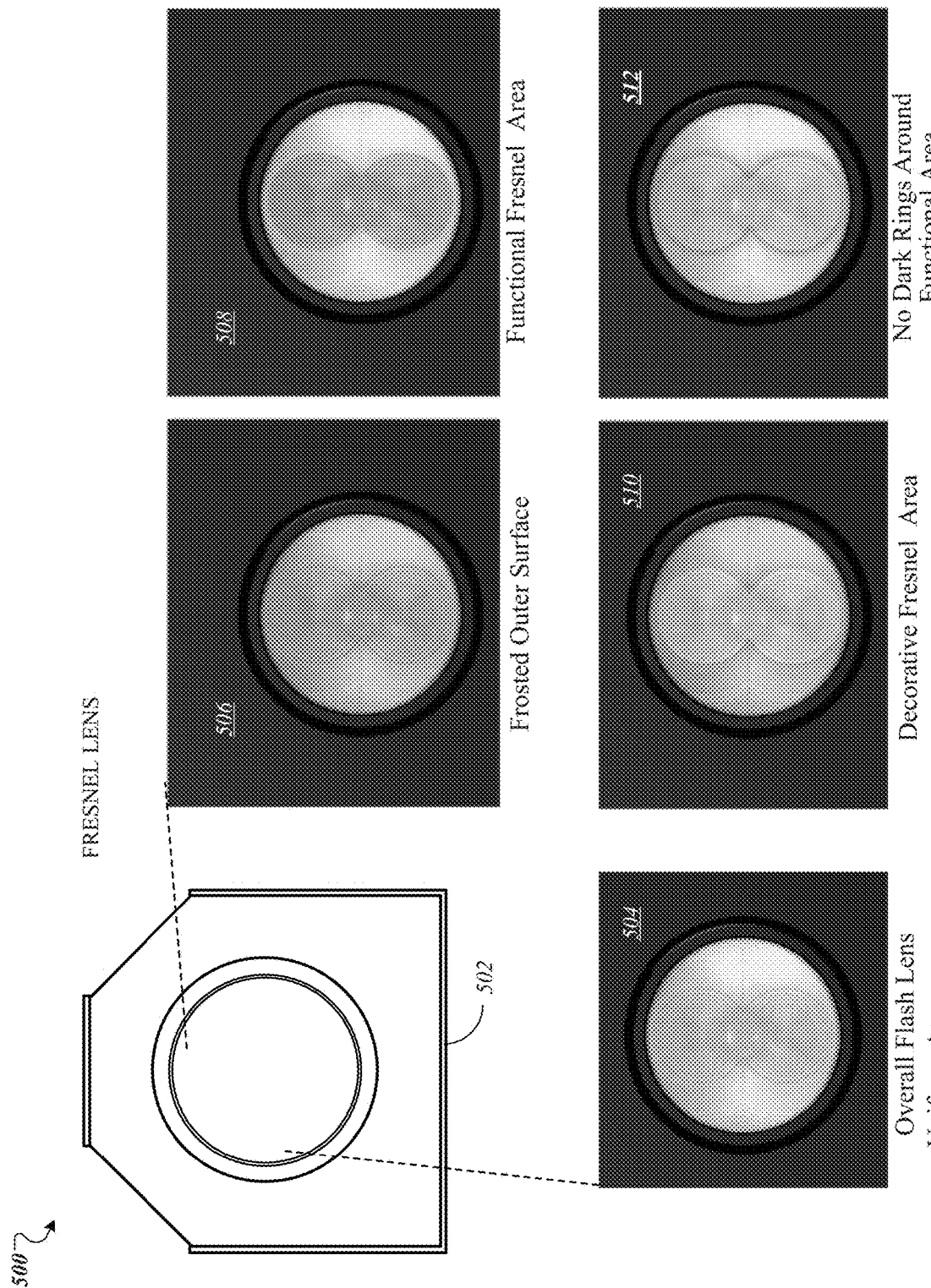
FIG. 5 is a block diagram that illustrates an example of a system showing various covers for a flash module.

FIG. 5 is a block diagram that illustrates an example of a system 500 showing various covers for a flash module. In particular, a top portion of the flash module, e.g., a top portion of the cylindrical portion, can be coated with a white frosty substance to give the lens, e.g., lens 308, a frosted appearance. The frosted appearance is purely an aesthetic look to reduce sharp lines, artifacts, or effects caused by the effects of the fresnel pattern. Additionally, the frosted appearance does not negatively affect the optical performance of the flash module.

In some implementations, a top portion of the flash module 502 can be coated with a white aesthetic to give the flash lens a uniform appearance 504. The uniform appearance 504 may be more appeasing to the consumer. In another example, a top portion of the flash module 502 can be coated with the white aesthetic to give the flash lens a frosted outer surface 506. The white aesthetic can also be applied to give the flash lens a functional fresnel area 508. In another example, the white aesthetic can be applied to a top portion of the flash module 502 to give a decorative fresnel area 510 or to remove the dark outer rings 512. In other implementations, the top portion of the flash module 502 can be coated with a high polish surface, such as SPI Finish A-1, which is generally defined as super high glossy. In other implementations, a texture is applied to the top portion of the flash module 502 to achieve a particular aesthetic, such as those aesthetics visualized in system 500. The texture can be applied using a molding tool or a post process application. For example, the post processing application can apply the texture using sandpaper or using a computer numerical control (CNC) machine to apply the texture via a lathe, router, grinder, or laser, to name a few examples. Additionally, the post processing application can apply the texture using sandblasting or a laser, or a combination of the above applications.

FIG. 6 is a flow diagram that illustrates an example process 600 for assembling a flash module. The process 600 is performed for assembling a flash module, such as flash module 104 utilized in system 100 and shown in FIG. 3.

At least one LED module is mounted on a top portion of a first substrate for providing light (602). In particular, the flash module includes at least one LED module mounted on a top portion of the first substrate. The flash module can include one or multiple LED modules mounted on the first substrate, e.g., the printed circuit board.

A lens portion is mounted on a second substrate in a first region of the second substrate, the lens portion illuminates the light from the at least one LED module and the second substrate includes the first region having a first diameter and a second region for providing a path for the illuminating light having a second diameter, wherein the first diameter is greater than the second diameter (604). The lens portion can include a fresnel lens, a concave lens, and a convex lens. The lens portion is mounted on the second substrate. Additionally, the lens portion can illuminate the light provided by the LED modules mounted on the first substrate.

The second substrate includes a first region and a second region. In some implementations, the first region contains the lens portion and the second region contains the top cylindrical portion. The first region has a first diameter and the second region has a second diameter, and the first diameter is greater than the second diameter. For example, the first diameter can be 3.8 millimeters and the second diameter can be 7.5 millimeters.

The second substrate is mounted on the first substrate (606). In particular, the second substrate is mounted on the first substrate through a vertical connector. The vertical connector connects around the outer portion of a bottom portion of the second substrate and a top portion of the first substrate. As a result, this connection creates a gap region for the LED modules to exist between the bottom portion of the second region and the top portion of the first substrate.

A substance is applied to a top portion of the second substrate from an end of the first diameter to the end of the second diameter and to a side portion of the second substrate in the second region (608). In particular, the top portion of the second substrate, which includes a shoulder region, a collarbone region, and a neck region, can be painted with a substance that has a particular color to generate a desired optical effect of the flash module. The substance can make the top portion of the second substrate more reflective or more absorptive of the light emitted by the flash module. Additionally, the substance may be applied to meet specification requirements for a particular client device in which the flash module is to be integrated.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A flash module, comprising:
   an LED module;
   a substrate located above the LED module, the substrate being at least partially transparent to provide a path for light from the LED module to a front of the flash module, the substrate including:
      a bottom portion that has a first width, and
      a top portion that is located on top of the bottom portion and that has a second width that is less than the first width, both the bottom portion and the top portion being in front of the LED module and providing the path for light from the LED module to the front of the flash module; and
   a water adhesive on a top surface of the bottom portion of the substrate, the top surface extending from an end of the first width to an end of the second width.

2. The flash module of claim 1, further comprising a lens mounted under the bottom portion of the substrate to illuminate light from the LED module.

3. The flash module of claim 2, wherein the lens has a third width that is greater than the second width.

4. The flash module of claim 3, wherein the third width of the lens is same as the first width of the bottom portion of the substrate.

5. The flash module of claim 1, further comprising a second substrate to which the LED module is mounted, the second substrate and the LED module being located under the substrate.

6. The flash module of claim 5, further comprising a connector that connects the second substrate to the substrate.

7. The flash module of claim 1, wherein a side view of the bottom portion and the top portion provides a top hat shape, with the bottom portion providing a bottom of the top hat shape and the top portion provide a top of the top hat shape.

8. The flash module of claim 1, wherein the flash module is without water adhesive contacting a side surface of the top portion of the substrate.

9. The flash module of claim 1, further comprising a colored substance painted on the top surface of the bottom portion of the substrate, between the water adhesive and the top surface of the bottom portion of the substrate.

10. The flash module of claim 9, wherein the colored substance is painted on a side surface of the top portion of the substrate.

11. The flash module of claim 1, wherein the substrate includes a slanted collarbone region that is slanted at a particular angle between a top surface of the bottom portion and a side surface of the top portion.

12. The flash module of claim 11, wherein the particular angle is 45 degrees.

13. The flash module of claim 1, wherein the bottom portion of the substrate and the top portion of the substrate are integrally formed.

14. The flash module of claim 1, wherein the top portion of the substrate has a circular periphery.

15. The flash module of claim 1, wherein the top portion of the substrate is surrounded by a phone housing.

16. The flash module of claim 15, wherein the phone housing abuts (i) a peripheral surface of the top portion, and (ii) a top surface of the bottom portion.

17. The flash module of claim 1, further comprising an adhesive on a peripheral surface of the top portion.

* * * * *